(12) United States Patent
Nucci

(10) Patent No.: US 8,831,942 B1
(45) Date of Patent: Sep. 9, 2014

(54) SYSTEM AND METHOD FOR PITCH BASED GENDER IDENTIFICATION WITH SUSPICIOUS SPEAKER DETECTION

(75) Inventor: Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 963 days.

(21) Appl. No.: 12/728,151

(22) Filed: Mar. 19, 2010

(51) Int. Cl.
*G10L 15/00* (2013.01)
*G10L 17/00* (2013.01)
*G10L 21/00* (2013.01)
*G10L 25/90* (2013.01)
*G10L 25/93* (2013.01)

(52) U.S. Cl.
USPC ........... 704/246; 704/207; 704/208; 704/247; 704/248; 704/249; 704/250

(58) Field of Classification Search
USPC ................................................ 704/246–250
See application file for complete search history.

(56) References Cited

U.S. PATENT DOCUMENTS

| | | | | | |
|---|---|---|---|---|---|
| 4,653,098 | A | * | 3/1987 | Nakata et al. | 704/207 |
| 5,749,065 | A | * | 5/1998 | Nishiguchi et al. | 704/200.1 |
| 7,778,831 | B2 | * | 8/2010 | Chen | 704/246 |
| 8,160,877 | B1 | * | 4/2012 | Nucci et al. | 704/246 |
| 2003/0110038 | A1 | * | 6/2003 | Sharma et al. | 704/270 |
| 2004/0030550 | A1 | * | 2/2004 | Liu et al. | 704/231 |
| 2008/0046241 | A1 | * | 2/2008 | Osburn et al. | 704/250 |
| 2008/0052074 | A1 | * | 2/2008 | Gopinath et al. | 704/256 |
| 2008/0059156 | A1 | * | 3/2008 | Han et al. | 704/207 |
| 2009/0063146 | A1 | * | 3/2009 | Yoshioka | 704/250 |

FOREIGN PATENT DOCUMENTS

KR     2005036301 A   *   4/2005

OTHER PUBLICATIONS

Vergin et al, "Robust gender-dependent acoustic-phonetic modelling in continuous speech recognition based on a new automatic male/female classification", Oct. 3-6, 1996, Spoken Language, 1996. ICSLP 96. Proceedings., Fourth International Conference on, vol. 2, no., pp. 1081-1084 vol. 2.*
Zeng et al, "Robust Children and Adults Speech Classification,", Aug. 2007, Fuzzy Systems and Knowledge Discovery, 2007. FSKD 2007. Fourth International Conference on , vol. 4, no., pp. 721-725, 24-27.*
Ting et al, "Combining MFCC and Pitch to Enhance the Performance of the Gender Recognition,", 2006, Signal Processing, 2006 8th International Conference on , vol. 1, no., 16-20.*

(Continued)

*Primary Examiner* — Richemond Dorvil
*Assistant Examiner* — Olujimi Adesanya
(74) *Attorney, Agent, or Firm* — Fernandez & Associates, LLP

(57) ABSTRACT

A method is provided for identifying a gender of a speaker. The method steps include obtaining speech data of the speaker, extracting vowel-like speech frames from the speech data, analyzing the vowel-like speech frames to generate a feature vector having pitch values corresponding to the vowel-like frames, analyzing the pitch values to generate a most frequent pitch value, determining, in response to the most frequent pitch value being between a first pre-determined threshold and a second pre-determined threshold, an output of a male Gaussian Mixture Model (GMM) and an output of a female GMM using the pitch values as inputs to the male GMM and the female GMM, and identifying the gender of the speaker by comparing the output of the male GMM and the output of the female GMM based on a pre-determined criterion.

28 Claims, 6 Drawing Sheets

(56) References Cited

OTHER PUBLICATIONS

Slomka et al, "Automatic gender identification optimised for language independence,", Dec. 1997, TENCON '97. IEEE Region 10 Annual Conference. Speech and Image Technologies for Computing and Telecommunications., Proceedings of IEEE , vol. 1, no., pp. 145-148 vol. 1, 4-4.*

Deepawale et al, "Energy Estimation between Adjacent Formant Frequencies to Identify Speaker's Gender", Apr. 7-9, 2008, Information Technology: New Generations, 2008. ITNG 2008. Fifth International Conference on , vol., no., pp. 772-776.*

Skvarc et al, "Speaker Sex Estimation", 1990, ESCA Proc. Speaker Characterisation in Speech Technology, pp. 181-186.*

D. Reynolds and R. Rose. "Robust text-independent speaker identification using gaussian mixture speaker models". IEEE/ACM Transactions on Speech and Audio Processing, Jan. 1995, pp. 72-83, vol. 3, No. 1.

F. Kaiser, P. Maragos and T.F. Quatieri. "On Amplitude and Frequency Demodulation using Energy Operators". IEEE/ACM Transactions on Signal Processing, Apr. 1993, pp. 1532-1550, vol. 41, No. 4.

P. Tsiakoulis and A. Potamianos. "Statistical Analysis of Amplitude Modulation in Speech Signals using AM-FM Model". IEEE ICASSP, 2009 pp. 3981-3984, vol. 41, No. 4.

C. Espy-Wilson. "A Phonetically based Semivowel Recognition System", Acoustics, Speech, and Signal Processing, IEEE International Conference on ICASSP '86, Apr. 1986, pp. 2775-2778.

Reynolds, Douglas A. and Rose, Richard C., Robust Text-Independent Speaker Identification Using Gaussian Mixture Speaker Models, Jan. 1995, IEEE Transactions on Speech and Audio Processing, pp. 72-83, vol. 3, No. 1, IEEE.

* cited by examiner

SYSTEM AND METHOD FOR PITCH BASED GENDER IDENTIFICATION WITH SUSPICIOUS SPEAKER DETECTION

CROSS-REFERENCE TO RELATED APPLICATIONS

This application is related to U.S. patent application Ser. No. 12/563,784 filed on Aug. 6, 2009 and entitled: "Hierarchical Real-Time Speaker Recognition For Biometric VOIP Verification And Targeting." Accordingly, U.S. patent application Ser. No. 12/563,784 is incorporated herein by reference.

BACKGROUND OF THE INVENTION

1. Field of the Invention

The present invention relates to computers and computer networks. More particularly, the invention relates to speaker gender identification.

2. Background of the Related Art

Speech-based gender identification has many potential applications in speaker and speech recognition as well as multi-media signal analysis applications. Generally speaking, pitch period and Mel-Frequency Cepstral Coefficients (MFCC) are two most commonly used features in the existing gender identification system.

Good estimate of the pitch period can only be obtained for voiced portions of a clean non-noisy speech signal. Moreover, the overlap of the pitch values between male and female voices intrinsically limits the use of the pitch feature for gender identification. The average fundamental frequency (i.e., the reciprocal of pitch period) for men generally falls between (140) and 146 Hz, whereas the average fundamental frequency for women is usually between 188 and 221 Hz.

Furthermore, MFCC based gender identification typically requires high computation complexity and is sensitive to speech recording condition such as the noise condition, the microphone condition, etc. If the speech samples used for training and testing are recorded in different environments or with different microphones, MFCC feature may fail to work.

The pitch feature and MFCC feature have been combined to improve the performance of the gender identification system. However, due to the intrinsic drawbacks of the two features, the existing systems continue to encounter problems in gender identification performance, computation complexity, and recording condition sensitivity.

SUMMARY

In general, in one aspect, the invention relates to a method for identifying a gender of a speaker. The method steps includes obtaining speech data of the speaker, extracting a plurality of vowel-like speech frames from the speech data, analyzing the plurality of vowel-like speech frames to generate a feature vector comprising a plurality of pitch values, wherein each of the plurality of pitch values corresponds to one of the plurality of vowel-like frames, analyzing the plurality of pitch values to generate a most frequent pitch value, determining, in response to the most frequent pitch value being between a first pre-determined threshold and a second pre-determined threshold, an output of a male Gaussian Mixture Model (GMM) and an output of a female GMM using the plurality of pitch values as inputs to the male GMM and the female GMM, and identifying the gender of the speaker by comparing the output of the male GMM and the output of the female GMM based on a pre-determined criterion.

In general, in one aspect, the invention relates to a system for identifying a gender of a speaker. The system includes a processor and memory storing instructions when executed by the processor comprising functionalities for extracting a plurality of vowel-like speech frames from the speech data, analyzing the plurality of vowel-like speech frames to generate a feature vector comprising a plurality of pitch values, wherein each of the plurality of pitch values corresponds to one of the plurality of vowel-like frames, analyzing the plurality of pitch values to generate a most frequent pitch value, determining, in response to the most frequent pitch value being between a first pre-determined threshold and a second pre-determined threshold, an output of a male Gaussian Mixture Model (GMM) and an output of a female GMM using the plurality of pitch values as inputs to the male GMM and the female GMM, and identifying the gender of the speaker by comparing the output of the male GMM and the output of the female GMM based on a pre-determined criterion.

In general, in one aspect, the invention relates to a computer readable medium embodying instructions to perform real-time speaker recognition. The instructions when executed by a computer include functionality for obtaining speech data of the speaker, extracting a plurality of vowel-like speech frames from the speech data, analyzing the plurality of vowel-like speech frames to generate a feature vector comprising a plurality of pitch values, wherein each of the plurality of pitch values corresponds to one of the plurality of vowel-like frames, analyzing the plurality of pitch values to generate a most frequent pitch value, determining, in response to the most frequent pitch value being between a first pre-determined threshold and a second pre-determined threshold, an output of a male Gaussian Mixture Model (GMM) and an output of a female GMM using the plurality of pitch values as inputs to the male GMM and the female GMM, and identifying the gender of the speaker by comparing the output of the male GMM and the output of the female GMM based on a pre-determined criterion.

Other aspects and advantages of the invention will be apparent from the following description and the appended claims.

DETAILED DESCRIPTION

Figure 1A:
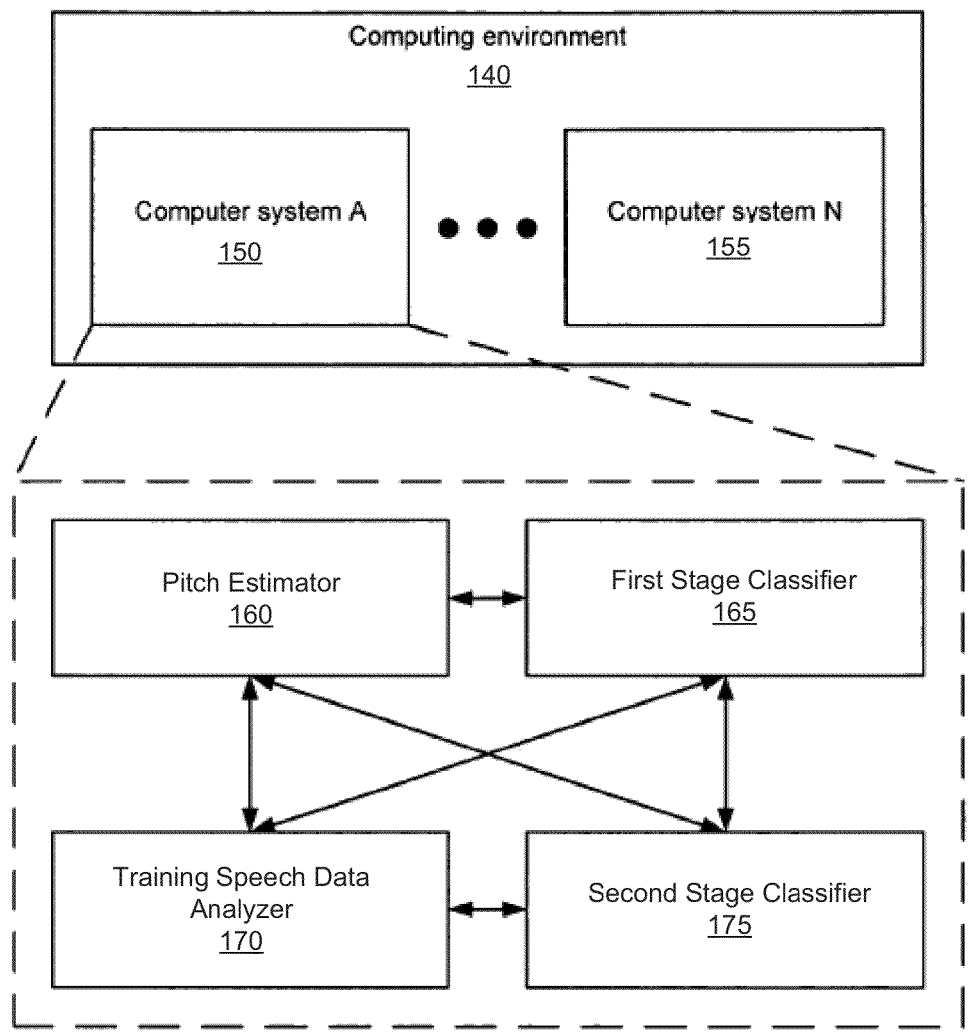
FIG. 1A shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, embodiments of the invention relates to a system and method for identifying speaker gender based on pitch features extracted from amplitude envelopes of short-time (typically less than 10 seconds, e.g., 3 second speech data are used in some of the examples described below) speech data using the energy separation algorithm. In one or more embodiments of the invention, a speech content independent pitch period estimation method and bandpass filtering process are used to generate the pitch features that are language-independent, microphone-independent, and robust to the speech recording condition (e.g., noise). Further, a two-stage classifier with suspicious speaker detection scheme is used to address mis-identification problem caused by the overlap of pitch values between male and female speakers. The first stage classifier is threshold based and identifies the gender for those speakers whose pitch values do not fall within an overlap range. Other speakers whose pitch values fall within the overlap range are designated as suspicious speakers whose genders are identified by the second stage classifier using Gaussian Mixture Model (GMM) method. Accordingly, embodiments of the invention minimizes mis-identification problem while reducing computation complexity.

FIG. 1A shows a system block diagram according to aspects of the invention. Specifically, FIG. 1A shows a diagram of a computing environment ((140)) in accordance with one or more embodiments. In one or more embodiments, one or more of the modules shown in FIG. 1A may be omitted, repeated, and/or substituted. Accordingly, embodiments of, computing thickness-independent horizontal and vertical permeability should not be considered limited to the specific arrangements of modules shown in FIG. 1A.

In one or more embodiments, the computing environment ((140)) may include one or more computer systems (e.g., computer system A ((150)), computer system N ((155)), etc.) configured to perform various tasks for pitch based gender identification with suspicious speaker detection. In one or more embodiments of the invention, the computer system(s) (e.g., (150), (155)) may be computer servers, embedded systems (e.g., a computer located in network equipment), desktop computers, laptop computers, personal digital assistants, any other similar type of computer system, or any combination thereof.

Specifically, in one or more embodiments, one or more of the computer systems (e.g., (150), (155)) may include a pitch estimator ((160)), a first stage classifier ((165)), a second stage classifier ((170)), and/or a training speech data analyzer ((175)). In one or more embodiments, the aforementioned components (i.e., (160), (165), (170), (175)) may be located in a single computer system (e.g., (150), (155)), distributed across multiple computer systems (e.g., (150), (155)), or any combination thereof. In one or more embodiments, each of the aforementioned components (i.e., (160), (165), (170), (175)) may include one or more software modules, one or more hardware modules, or any combination thereof. Further, in one or more embodiments, the aforementioned components (i.e., (160), (165), (170), (175)) may be configured to communicate with each other via function calls, application program interfaces (APIs), a network protocol (i.e., a wired or wireless network protocol), electronic circuitry, any other similar type of communication and/or communication protocol, or any combination thereof.

In one or more embodiments of the invention, the pitch estimator ((160)) may be configured to process speech data for determining pitch values. For example, the speech data may be obtained as described in the U.S. patent application Ser. No. 12/563,784, which is incorporated herein by reference. Processing speech data for determining pitch values is discussed below with respect to FIGS. 2-3B.

In one or more embodiments of the invention, the first stage classifier ((165)) may be configured to identify gender of a speaker based on pitch values generated by the pitch estimator ((160)). Identifying gender of a speaker based on pitch values is discussed below with respect to FIGS. 2-3B.

In one or more embodiments of the invention, the second stage classifier ((175)) may be configured to further identify gender of a speaker in cooperation with the first stage classifier ((165)). Further identifying gender of a speaker in cooperation with the first stage classifier ((165)) is discussed below with respect to FIGS. 2-3B.

In one or more embodiments of the invention, the training speech data analyzer ((170)) may be configured to determine threshold values and configure Gaussian Mixture models (GMMs) based on pitch values generated by the pitch estimator ((160)). In one or more embodiments, the threshold values and the GMMs are used by the first stage classifier ((165)) and the second stage classifier ((175)) to identify gender of a speaker. Determining threshold values and configuring GMMs based on pitch values is discussed below with respect to FIGS. 2-3B.

In one or more embodiments of the invention, the pitch estimator ((160)), the first stage classifier ((165)), the second stage classifier ((170)), and/or the training speech data analyzer ((175)) may be included in the classifier (115) described in reference to FIG. 1 of the U.S. patent application Ser. No. 12/563,784, which is incorporated herein by reference. Throughout this document, the term "pitch value" is equivalent to the term "pitch period" of the incorporated U.S. patent application Ser. No. 12/563,784. Further, the GMMs described in this document are used to model pitch vector of suspicious speakers as oppose to the use of GMMs in modeling MFCC of the incorporated U.S. patent application Ser. No. 12/563,784. Using GMMs to model pitch vector of suspicious speakers is discussed below with respect to FIGS. 2-3B.

Figure 1B:
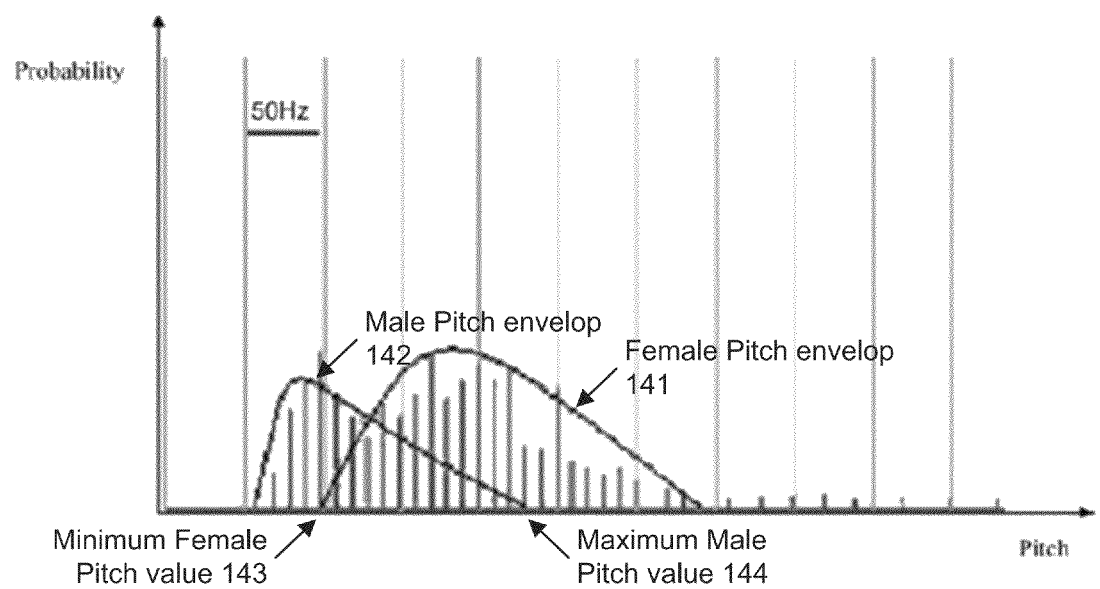
FIG. 1B shows an example statistical diagram of male and female pitch values according to aspects of the invention.

FIG. 1B shows an example statistical histogram of male and female pitch values according to aspects of the invention. As shown in FIG. 1B, the X-axis represents most frequent pitch value of speakers divided into divisions or bins (e.g., each division/bin corresponds to 10 Hz difference in most frequent pitch value) while the Y-axis represents frequency of occurrence (i.e., number of speakers whose most frequent pitch value falls within a division/bin). Further as shown in FIG. 1B, the portion of the histogram corresponding to female speakers is associated with an envelop (141) intersecting the X-axis at a minimum female pitch value (143) while the portion of the histogram corresponding to male speakers associated with an envelop (142) intersecting the X-axis at a maximum male pitch value (144). The envelop (141) and envelop (142) are said to have an overlap (i.e., overlap region along the X-axis) bounded by the minimum female pitch value (143) and the maximum male pitch value (144). Determining most frequent pitch value of speakers as well as using the minimum female pitch value (143) and the maximum male pitch value (144) in identifying speaker gender is discussed below with respect to FIGS. 2-3B.

As noted above, embodiments of the invention relate to a gender identification method based on pitch features. More details are described below and in reference to the flow chart shown in FIG. 2. In particular, MFCC features of speech data are not used because of higher computation complexity requirements and unnecessarily generating linguistic information not needed for gender identification. In addition, MFCC features are not robust to changing recording condition, which greatly limits the practical application. In an example pitch period estimation method, the short-time speech is modeled as sums of amplitude modulation-frequency modulation (AM-FM) formant models. The formant resonances can be obtained by bandpass filtering the original speech signal using the formant frequency as the center frequency. Then the quasi-periodic AM components are extracted from the formant resonances by energy separation algorithm from which the period of the AM components is obtained as the pitch period estimation. AM components represent the envelopes of the short-time speech. For AM components, the noise effect and the possible distortion caused by the change of the recording condition is less severe than the original speech signal. Moreover, as the bandpass filtering process is used, a significant part of the noise is removed and the frequency distortion effect is reduced while most of the formant resonance is preserved. Hence, the pitch feature described above for the gender identification is language-independent, microphone-independent and robust to the noise condition. On the other hand, to address the mis-identification problem caused by the overlap of the pitch values between male and female voices, a two-stage (or multi-stage) classifier with suspicious speaker detection scheme is employed. This scheme allows the gender of different speakers to be identified in two or more stages. In the first stage (quick stage) of the gender identification, a relatively simple thresholding classifier is used to generate the gender decision for those speakers whose pitch values do not fall within the overlap. For the rest of speakers (referred to as suspicious speakers) whose pitch values fall within the overlap, a more complicated and more effective Gaussian Mixture Model (GMM) classifier is used in the second-stage (slow-stage) gender identification. The procedure continues until all speakers are reliably labeled as male or female. In this way, the mis-identification problem caused by the overlap of male/female pitch values is eliminated to ensure a good gender identification performance. Furthermore, only those speakers who are not able to be reliably classified in the first stage will be further classified by the second stage classifier. Therefore, the computation complexity is reduced.

In summary, the pitch period of a speech signal is estimated as follows. For a speech signal, several vowel-like frames are first extracted. Then, one or more formant estimations are obtained for each of these vowel-like frames. Accordingly, each of the vowel-like frames is bandpass filtered using the respective one or more formant frequencies as the center frequency. The energy separation algorithm is then applied to the filtered frames and the AM components and FM components are separated. The last step is to estimate the periods of the quasi-periodic AM components as the pitch period estimations. All the estimations obtained from different frames form a vector of pitch values.

Specific details of an example workflow to extract the effective pitch feature for gender identification are described below. Initially, speech signal is modeled as sums of AM-FM formants models. There are several evidences for the existence of modulations in speech signal known to those skilled in the art. From the theoretical point of view, during speech production, the air jet flowing through the vocal tract is highly unstable and oscillates between its walls. Hence, it changes the effective cross-sectional areas and air masses and affects the frequency of a speech resonance. Meanwhile, vortices can easily build up and encircle the air jet passing through. These vortices can act as modulators of the air jet energy. Moreover, it is well known that slow time variations of the oscillator elements can result in amplitude or frequency modulation. Thus, during speech production, the time-varying air masses and effective cross sectional areas of vocal tract cavities that rapidly vary following the separated airflow can cause modulations. Also from experiment, if the energy operator is applied in the bandpass filtered speech vowel signals around their formants, several pulses are often yielded. These energy pulses indicate certain kind of modulation in each formant. Accordingly, speech signals are modeled using AM-FM formant models.

The AM-FM formant model is a nonlinear model that describes a speech resonance as a signal with a combined AM and FM structure:

$$r(t) = a(t)\cos(\omega_c t + \omega_m \int_0^t q(\tau)d\tau + \theta) \quad (1)$$

where $\omega_c$ is the "center value" of the formant frequency, $q(t)$ is the frequency modulating signal, and $a(t)$ is the time-varying amplitude. The instantaneous formant frequency signal is defined as $$\omega_i = \omega_c + \omega_m q(t) \quad (2)$$

The total short-time speech signal $s(t)$ is modeled as sums of K such AM-FM signals, one for each formant as below:

$$s(t) = \sum_{k=1}^{K} r_k(t) \quad (3)$$

In practical applications, speech signals are obtained from a fluent speech. Vowel-like speech frame extraction is used to extract speech frames that contain relatively more energy from the fluent speech for estimating the pitch values. Here, the short-time analysis interval extracted from the long-time fluent speech is called a frame. There are many reasons for using only the frames containing relatively more energy. On one hand, speech frames which contain relatively more energy could provide stronger pitch feature for gender identification. On the other hand, to decompose speech into AM components and FM components, formant estimation is performed to extract every AM-FM resonance corresponding to each formant by bandpass filtering the speech signal around all its formants. It is known to those skilled in the art that the acoustic characteristics of the obstruent sounds are not well represented through formants and the spectral characteristics of the noise source tend to mask the vocal tract resonances. Thus, the formants tracking are only suitable to the sonorant speech. Furthermore, stable pitch features should be obtained from voiced sounds. Voiced and sonorant speech frames usually contain relatively more energy.

In practice, for a given fluent speech signal, speech frames are extracted by continually shifting a window over the speech signal. The length of the window is termed as the frame length and the window shifting interval is termed as the frame interval. In an example system, the frame length is 2048 samples. With 2048 samples, the resolution of the estimated fundamental frequency (reciprocal of pitch period) can reach to about 10 Hz. This resolution value proved to be able to achieve a good gender identification performance. In one or more embodiments, the frame interval is set as about 20 samples. The energy of each frame is calculated by $$E(s_i) = \sum_{n=1}^{l} s_i^2(n) \quad (4)$$

where $s_i(n)$ is the ith frame extracted from the fluent speech signal and l is the frame length. Energy values of all the frames are ordered and the top ones are selected for use to obtain the pitch feature.

After all frames which contain relatively more energy are obtained, linear predictive coding (LPC) analysis is used to estimate formant frequencies. Pre-emphasis pre-filtering is used to condition the speech frame before further analysis. From a theoretical point of view, a proper pre-filter may remove the effects of glottal wave shape and the radiation characteristics of the lip. This will leave the all-pole vocal tract filter for analysis without wasting the LPC poles on glottal and radiation shaping. From a spectrum point of view, any preliminary flattening of the overall input spectrum before LPC processing allows the LPC analysis to perform spectrum flattening better. Basically, proper speech pre-emphasis will reduce the order of an LPC fit needed to do an equivalent spectrum match. Finally, from the point of view of a finite word length implementation, the proper pre-emphasis will reduce numerical errors.

The speech signal pre-emphasis is performed by calculating its first-order difference. The new filtered speech signal is given by $$s'_n = s_n + a s_{n-1} \quad (5)$$

where $s_n$ is the input speech signal and $s'_n$ is the pre-emphasis filtered speech signal. An optimal value may be obtained by solving for the filter that makes "white". This is given by the first order predictor, where $$a = -R(1)/R(0) \quad (6)$$

where R(1) and R(0) are autocorrelation coefficients of the input speech signal. The filtered signal is then guaranteed to have a smaller spectral dynamic range.

In order to extract a short-time interval from the pre-emphasis filtered speech signal for calculating the autocorrelation function and spectrum, the pre-emphasis filtered speech signal is multiplied by an appropriate time window. The multiplication of the speech signal by the window function has two effects. First, it gradually attenuates the amplitude at both ends of the extraction interval to prevent an abrupt change at the endpoints. Second, the multiplication of the speech frame by an appropriate window reduces the spectral fluctuation due to the variation of the pitch excitation position within the analysis interval. This is effective in producing stable spectra. As the windowing produces the convolution for the Fourier transform of the window function and the speech spectrum, or the weighted moving average in the spectral domain, therefore the window function is determined that exhibits two characteristics in order to reduce the spectral distortion caused by the windowing. One is a high-frequency resolution, principally, a narrow and sharp main lobe. The other is a small spectral leak from other spectral elements produced by the convolution, in other words, a large attenuation of the side lode. In one or more embodiments, Hamming window, Hanning window, etc. are used.

After the pre-emphasis and windowing, formant estimation is performed. Formant frequency is one of the many useful speech parameters and is determined by a vocal tract shape or its movements in various pronunciations. The total short-time speech signal is modeled as the sums of K such AM-FM signals, one for each formant. Accordingly, formant estimation is performed for extracting all AM-FM resonances.

The formants are physically defined as poles in a system function expressing the characteristics of a vocal tract. However, capturing and tracking formants accurately from natural speech is complicated by the variety of speech sounds. The frequencies at which the formants occur are primarily dependent upon the shape of the vocal tract, which is determined by the positions of the articulators (i.e., tongue, lips, jaw. etc.). In continuous speech, the formant frequencies vary in time as the articulators change positions. Common methods for estimating formant frequencies (e.g., the analysis-by-synthesis (A-b-S) method and the LPC method) are based on the best matching between a spectrum to be analyzed and a synthesized one so that formant frequencies are estimated through spectral shapes. Hence, the estimation may be sensitive to spectral distortion and modifications.

In one or more embodiments of the invention, after preprocessing by pre-emphasis and windowing, the speech frame is first separated into 4 shorter segmentations, each of which has 512 samples. Each segmentation with 512 samples is considered to be stationary. Thus, the linear prediction analysis can be applied for each segmentation to obtain the linear prediction coefficients that optimally characterize its short-time power spectrum. Generally, the power spectral shape has a smaller change within such a shorter interval, hence the LPC analysis of these shorter segmentations should be more robust to spectral distortion and modifications. Root-finding algorithm is then employed to find the zeros of the LPC polynomial. The zeros correspond to peaks in the short-time power spectrum and thus indicate the locations of the formant frequencies. The transformation from complex root pairs $z = r^* \exp(+/-j\theta)$ and sampling frequency $f_x$ to formant frequency F and −3 dB bandwidth B are as follows:

$$F = \frac{f_s}{2\pi} \theta \, \text{Hz} \quad (7)$$

$$B = -\frac{f_s}{\pi} \ln r \, \text{Hz} \quad (8)$$

The order selection of the LPC model is important to accurate formant estimation. If the order is chosen smaller, the short-time power spectrum can't be fully characterized and it may lead to missing peaks. If chosen larger, the speech signal is over-determinedly modeled and spurious peak may occur. In an example process, the order for the analysis is set to be 30.

For each segmentation, as more than one zeros of the LPC polynomial can be found, more than one formant frequencies are obtained. The minimum one which contains the most speech energy is selected. Then for each frame, four estimations of the formant frequency are obtained. Generally, the four estimations are close to each other and each of them contains the most speech energy of each segmentation. Among the four, the minimum one is selected as the final formant estimation for the frame. This method yields formant estimation with a relatively low computation complexity.

The formant estimation is then used as the center frequency to bandpass filter the corresponding speech frame. Gabor filter is used as the bandpass filter, whose impulse and frequency responses are $$h(t) = e^{-\alpha^2 t^2} \cos(\omega_c t) \quad (9)$$

$$H(\omega) = \frac{\sqrt{\pi}}{2\alpha} \left( e^{-\frac{(\omega-\omega_c)^2}{4\alpha^2}} + e^{-\frac{(\omega+\omega_c)^2}{4\alpha^2}} \right) \quad (10)$$

where $\omega_c$ is the center value of the formant frequencies obtained above. The reasons for selecting the above bandpass filter are twofold: (i) It is optimally compact in the time and frequency width product assumes the minimum value in the uncertainty principle inequality; (ii) The Gaussian shape of $H(\omega)$ avoids producing side-lobes (or big side-lobes after truncation of $h(t)$) that could produce false pulses in the output of the latter energy separation. Here, a problem could be how to determine the bandwidth of the Gabor filter when doing the bandpass filtering. The 3-dB bandwidth of the Gabor filter is equal to $$\frac{\alpha}{\sqrt{2\pi}}.$$

The bandwidth should not be too wide because then they will include significant contributions from neighboring formants which may cause parasitic modulations. On the other hand, the Gabor filters should not have a very narrow bandwidth because this would miss or deemphasize some of the modulations. In our system, a 3-dB bandwidth of 400 Hz is used. Experimental results indicate that it could be a suitable choice.

All the corresponding bandpass filtered frames are obtained and the AM components and FM components needs to be decomposed. We use the "energy-tracking" operator to estimate the amplitude envelope $|a(t)|$ and its instantaneous frequency $\omega_i(t)$. For continuous-time signal, the energy operator is defined as:

$$\psi_c[x(t)] = [\dot{x}(t)]^2 - x(t)\ddot{x}(t) \quad (11)$$

For discrete-time signal, the energy operator is defined as $$\omega_d[x(n)] = x^2(n) - x(n-1)x(n+1) \quad (12)$$

where $n = 0, \pm 1, \pm 2, \ldots$. It can be concluded that for any constants $A$ and $\omega_c$, the following equation holds:

$$\omega_c[A\cos(\omega_c t + \theta)] = (a\omega_c)^2 \quad (13)$$

For time-varying amplitude and frequency, the following equation holds:

$$\psi_c[a(t)\cos(\int_0^t \omega_i(\tau)d\tau + \theta)] = (a(t)\omega_i(t))^2 \quad (14)$$

Assuming that the signals $a(t)$ and $\omega_i(t)$ do not vary too fast in time compared to $\omega_c$. Thus, the combined use of the energy operator on the AM-FM signal and its derivative (or difference) can lead to an effective algorithm for separately estimating the amplitude signals and the frequency signals. In the example process, the discrete-time signal is considered. The discrete energy separation algorithm (DESA) is shown as follows:

$$x(n) - x(n-1) = y(n) \quad (15)$$

$$\arccos\left(1 - \frac{\psi[y(n)] + \psi[y(n+1)]}{4\psi[x(n)]}\right) \approx \omega_i(n) \quad (16)$$

$$\sqrt{\frac{\psi[x(n)]}{1 - \left(1 - \frac{\psi[y(n)] + \psi[y(n+1)]}{4\psi[x(n)]}\right)^2}} \approx |a(n)| \quad (17)$$

It is very simple to implement DESA since it only requires a few simple operations per output sample and involves a very short window of samples around the time instant at which we estimate the amplitude and frequency.

The amplitude envelope $a(n)$ obtained by DESA is a quasi-periodic signal. Actually, its period is the pitch period. By estimating the period of $a(n)$, the pitch period is obtained. The formant frequency mainly depends on the vocal tract shape and the positions of the articulators (tongue, lips, jaw, etc.). It may be different in various pronunciations even for the same speaker. Thus, the formant frequency is a content-dependent feature and not a stable feature for gender identification. Pitch represents the perceived fundamental frequency of a sound. Usually male speakers have relatively lower fundamental frequency values while the female speakers have relatively higher fundamental frequency values. Also it is relatively stable for a specific speaker. Thus, it could be a good feature for gender identification.

Power spectrum analysis is used to estimate the pitch period. The quasi-periodicity of the amplitude envelope in the time domain would yield peaks in the corresponding power spectrum. Thus, the problem of pitch period estimation can be converted into the peak detection in the power spectrum. In the power spectrum of the amplitude envelope, we search for the largest non-dc peak and take the reciprocal of its frequency location as our estimation of the pitch period. The resolution of the fundamental frequency (reciprocal of pitch period) can reach to about 10 Hz. To increase the resolution of the estimation, the frame length needs to be increased. As the formant frequencies may have considerable change within a longer interval, the formant estimation and hence the pitch period estimation may not be accurate enough by using a longer frame. A frame length with 2048 samples seems to make a good tradeoff between the accuracy and the resolution. 10 Hz resolution proves suitable for accurate gender identification.

Figure 2:
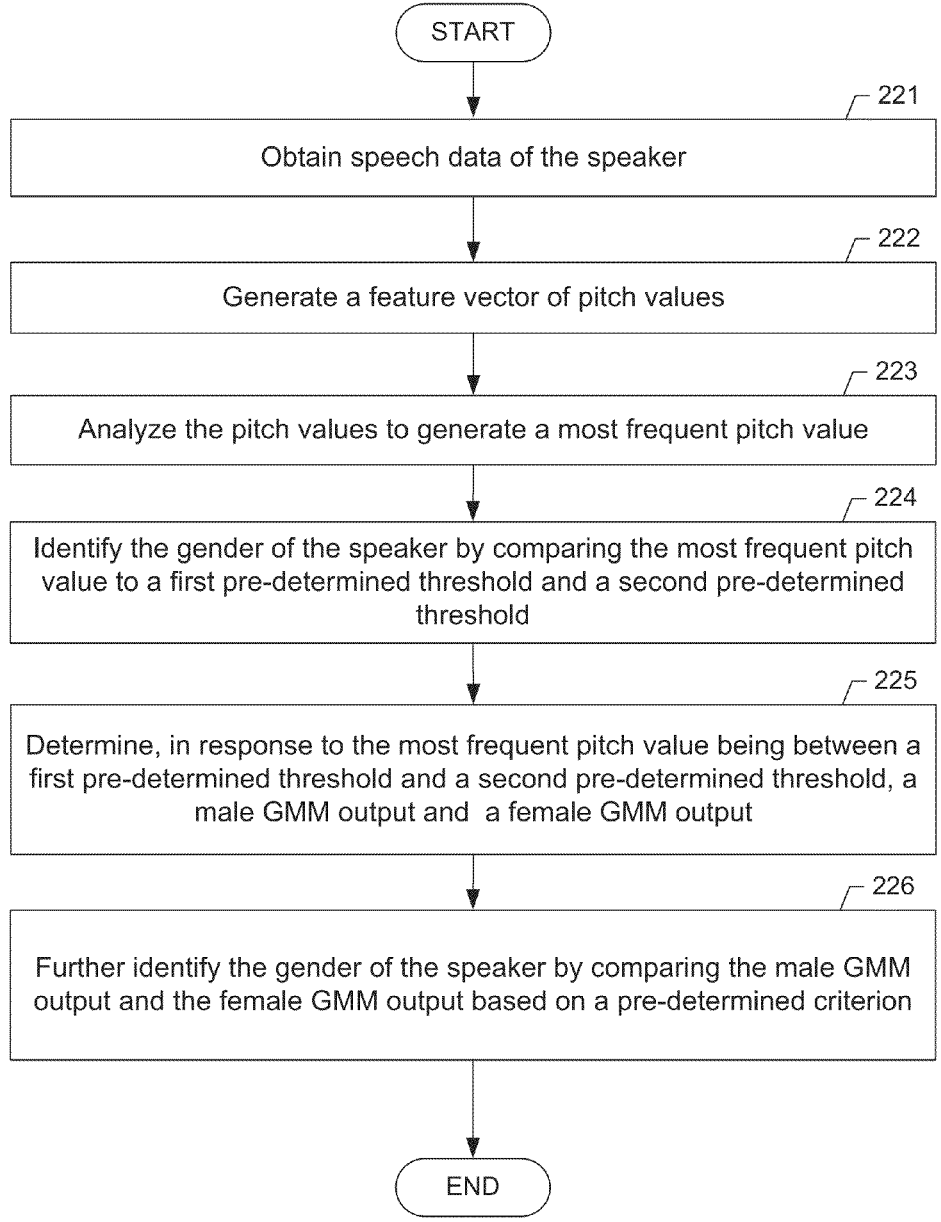
FIG. 2 shows a flowchart of a method according to aspects of the invention.

Consistent with the description above, FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using computing environment ((140)) described with respect to FIG. 1A above.

Initially in Step (221), speech data of the speaker is obtained. For example, the speech data may be recorded using a microphone. In Step (222), a feature vector of pitch values is generated from the speech data. In one or more embodiments, vowel-like speech frames are extracted from the speech data and analyzed to generate multiple pitch values, each of which corresponds to one of the vowel-like frames. The multiple pitch values then form the feature vector of pitch values.

In one or more embodiments, each vowel-like speech frame is represented as a sum of a number of amplitude modulation and frequency modulation (AM-FM) models each corresponding to one of a number of formants. Accordingly, one or more dominant formant frequencies are determined, for each vowel-like speech frame, based on the underlying AM-FM models. Further, filtered speech frames are generated by band-passed filtering the vowel-like speech frames based on the respective dominant formant frequencies. Subsequently, a quasi-periodic amplitude envelop is generated from each of the filtered speech frames using discrete energy separation algorithm (DESA). Each quasi-periodic amplitude envelop is then used to determine a pitch value corresponding to each vowel-like speech frame thus collectively forming the feature vector of pitch values.

In one or more embodiments, the vowel-like speech frames are analyzed to generate the feature vector with a resolution of 10 Hz for the pitch values.

In Step (223), the pitch values in the feature vector is analyzed to generate a most frequent pitch value. For example, the pitch values may be analyzed as a histogram for identifying the most frequent pitch value based on a statistical measure, such as max, mode, mean, etc.

In Step (224), the gender of the speaker is identified by comparing the most frequent pitch value to a first pre-determined threshold and a second pre-determined threshold. In one or more embodiments, the gender is identified as male in response to the most frequent pitch value being less than the first pre-determined threshold and the gender is identified as female in response to the most frequent pitch value exceeding the second pre-determined threshold. Generally speaking, the first pre-determined threshold corresponds to a maximum male pitch value (e.g., maximum male pitch value (144) shown in FIG. 1B) while the second pre-determined threshold corresponds to a minimum female pitch value (e.g., minimum female pitch value (143) shown in FIG. 1B).

In one or more embodiments, male training speech data of a number of male speakers and female training speech data of a number of female speakers are obtained during a training phase. Statistics of male pitch values and female pitch values are then generated based on the male and female training speech data, respectively. Accordingly, the first pre-determined threshold is determined based on the female pitch values and the second pre-determined threshold is determined based on the male pitch values. For example, a number of most frequent female pitch values may be determined based on the number of female pitch values, where each of the most frequent female pitch values corresponds to one of the female speakers. Accordingly, the first pre-determined threshold is determined based on a minimum of the most frequent female pitch values. Similarly, a number of most frequent male pitch values may be determined based on the number of male pitch values, where each of the most frequent male pitch values corresponds to one of the male speakers. Accordingly, the second pre-determined threshold is determined based on a maximum of the most frequent male pitch values.

In one or more embodiments, the most frequent male pitch values and the most frequent female pitch values are determined with a resolution of 10 Hz.

In Step (225), an output of a male Gaussian Mixture Model (GMM) and an output of a female GMM are determined in response to the most frequent pitch value being between the first pre-determined threshold and the second pre-determined threshold. Generally speaking, pitch values of such speaker correspond to the overlapping region of male and female pitch value distribution shown in FIG. 1B above. In one or more embodiments, outputs of the male GMM and female GMM are generated by using the pitch values in the feature vector as inputs to the male GMM and the female GMM. In one or more embodiments, the male GMM and female GMM are trained using the male pitch values and female pitch values, respectively, using expectation maximization algorithm during a training phase. Further, the male GMM and the female GMM may be initialized by k-mean clustering.

In Step (226), the gender of the speaker is further identified by comparing the output of the male GMM and the output of the female GMM based on a pre-determined criterion. In one or more embodiments, such further identification is performed only to those speakers whose pitch value falls within the overlapping region of the male and female pitch value statistics as identified by the speaker's most frequent pitch value being between the first and second pre-determined threshold. In one or more embodiments, the gender is identified as male if the output of the male GMM exceeds the output of the female GMM while the gender is identified as female if the output of the male GMM is less than the output of the female GMM.

Figure 3A:
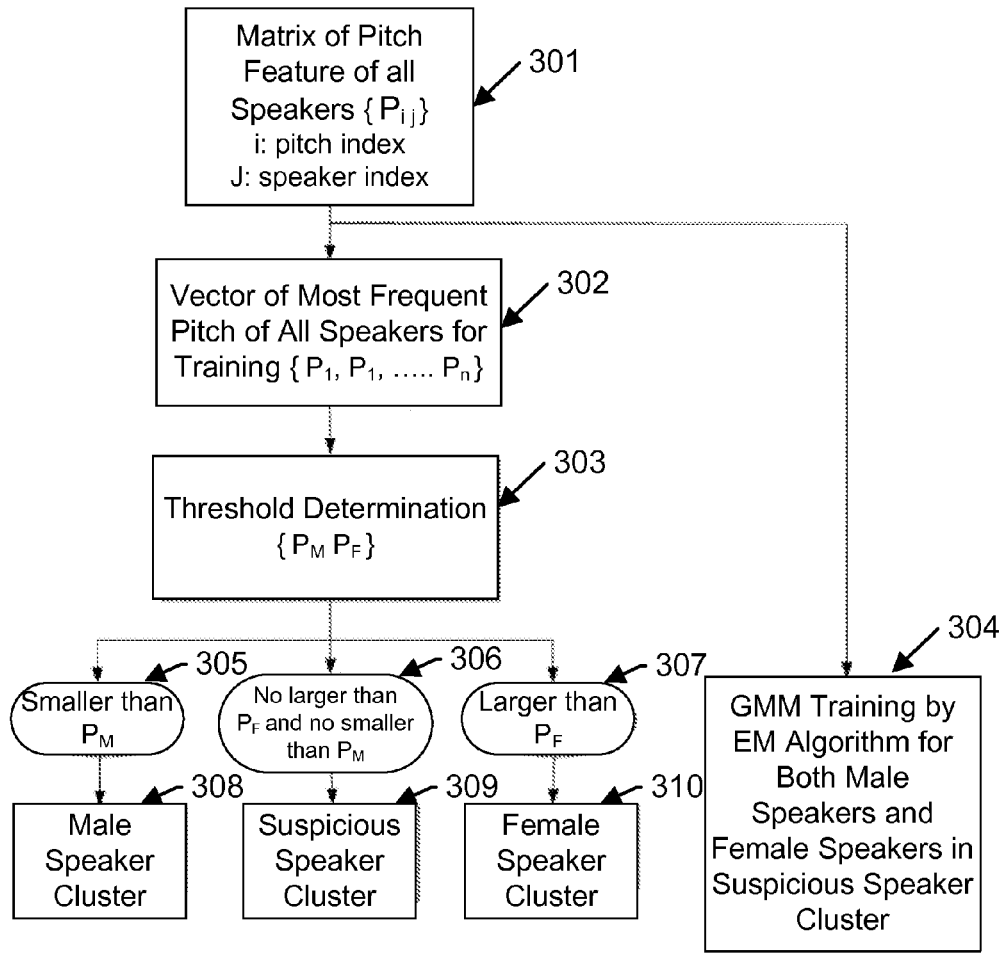
FIGS. 3A and 3B show an example according to aspects of the invention.
Figure 3B:
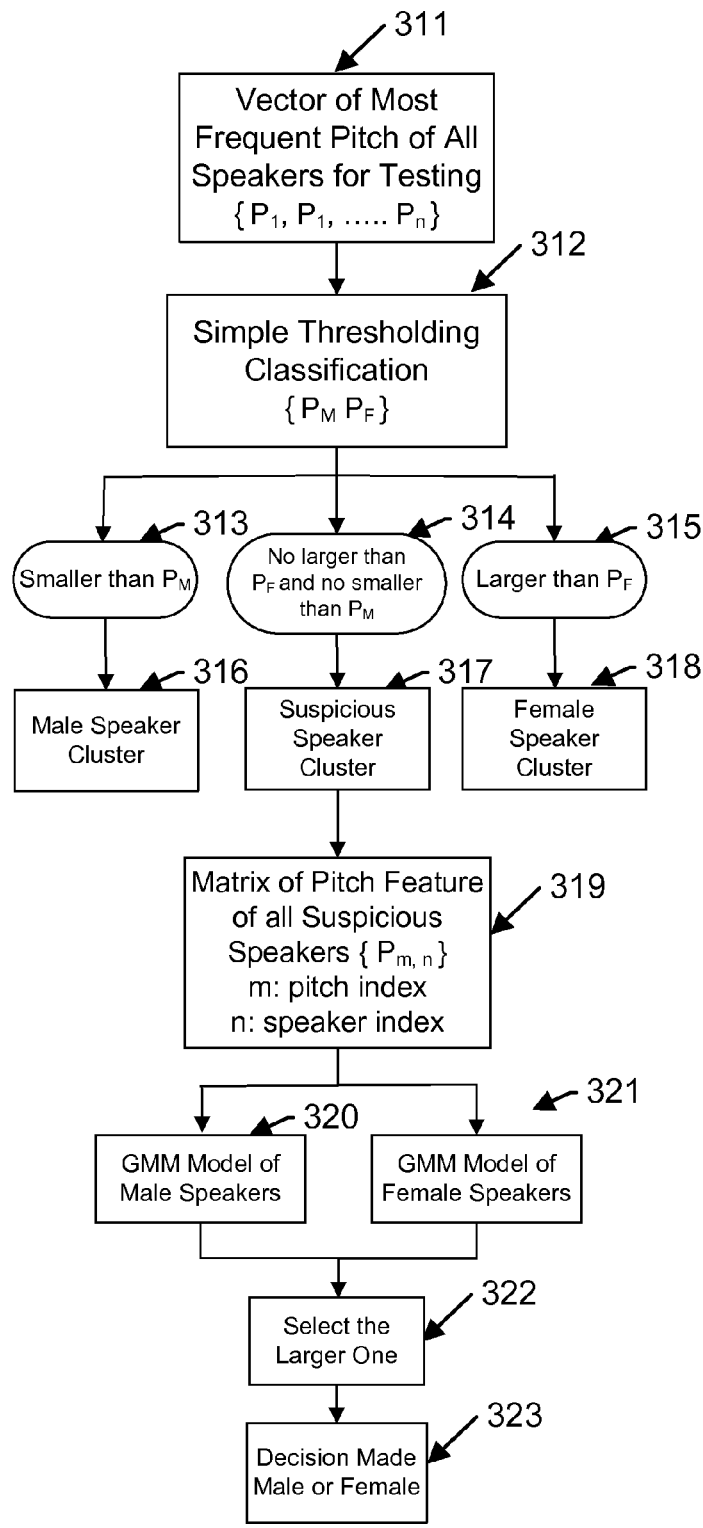

FIGS. 3A and 3B show an example according to aspects of the invention. FIG. 3A shows an example method for a training phase during which the pre-determined thresholds and the GMMs described in reference to FIG. 2 above are determined and trained, respectively. Generally speaking, the training phase is based on speech data collected from a number of speakers with known gender.

In element (301) of the training phase all the feature vectors of pitch values of all speakers are included into a matrix $P_{i,j}$, where i denotes the pitch index (for identifying a pitch value in a feature vector) and j denotes the speaker index (for identifying a speaker in the number of speakers).

In element (302), for each column k, the most frequent pitch value $P_k$ is determined for the kth column vector (i.e. the feature vector of speaker k).

In element (303), based on the most frequent pitch values $(P_1, P_2, \ldots P_n)$ of all speakers, two thresholds $P_M$ and $P_F$ are determined based on the criterion that all speakers whose most frequent pitch values are smaller than $P_M$ are male and all speakers whose most frequent pitch values are larger than $P_F$ are female. Accordingly, $P_M$ and $P_F$ correspond to the first and second pre-determined thresholds, respectively, described in reference to FIG. 2 above as well as correspond to the minimum female pitch value (143) and the maximum male pitch value (144), respectively, described in reference to FIG. 1B above.

With $P_M$ and $P_F$ determined, most frequent pitch value of each of the speakers is compared to $P_M$ in elements (305) and (306) as well as compared to $P_F$ in elements (306) and (307). Those speakers with most frequent pitch value smaller than $P_M$ are included into the male speaker cluster (308) and compared to the known genders of the speakers for confirmation. Those speakers with most frequent pitch value larger than $P_F$ are included into the female speaker cluster (310) and compared to the known genders of the speakers for confirmation. The elements (305, 307, 308, 310) generally correspond to the first stage classifier (165) described in reference to FIG. 1A above. The rest speakers are included into the suspicious speaker cluster (309) to be further processed by the second-stage classifier (e.g., the second-stage classifier (175) of FIG. 1A) using male and female GMMs trained in element (304) and compared to the known genders of the speakers for confirmation. In element (304), male GMM and female GMM are trained using Expectation Maximization (EM) algorithm based on the pitch feature vectors of all known male speakers and all known female speakers. Both GMMs are initialized by k-mean clustering. The dimension of the pitch feature vectors used for training is adjustable. The feature vector of the pitch values obtained for each speaker can be segmented into several lower-dimension feature vectors. These lower-dimension feature vectors can be used for training. The lower the dimension is, the more training samples are available. Coupled with the feature dimension, the order of GMMs is another adjustable parameter which is associated with the computation complexity and the gender identification performance.

Mathematically speaking, during the training phase or the later testing phase, if $P_k<P_M$, the speaker k is identified as a male, if $P_k>P_F$, the speaker k is identified as a female, if $P_M<P_k<P_F$, then speaker k is identified as a suspicious speaker. Suppose during the training phase, $\overline{P}_M$ is the vector of the most frequent pitch values of all known male speakers and $\overline{P}_F$ is the vector of the most frequent pitch values of all known female speakers. One method to determine the first and second pre-determined thresholds is to let $P_M$=min $\overline{P}_F$ and let $P_F$=max $\overline{P}_M$. Accordingly, all speakers can be grouped (e.g., during testing phase) into male speaker cluster, female speaker cluster, and suspicious speaker cluster at the first stage of the gender identification. In a more general method, the criteria $P_M$=<min $\overline{P}_F$ and let $P_F$>=max $\overline{P}_M$ may be used. The larger the difference between the two thresholds $P_M$ and $P_F$, the more speakers will be identified (e.g., during testing phase) as suspicious speakers, which improves the reliability of the gender identification of the first stage classifier. However, more processing needs to be done in the second stage gender identification. The total computation complexity is increased. Thus, the thresholds should be set according to the requirement of the practical application. Further, because the most frequent pitch values of all speakers is used to set the $P_M$ and $P_F$ thresholds, the resolution of the pitch values should be carefully chosen for both the training and test phases. If chosen too high, the gender identification throughput/speed performance may be too slow. If chosen too low, the most frequent pitch values may not sufficiently represent all pitch period estimations. In one or more embodiments, the resolution of 10 Hz is used. Still further, for one speaker, sometimes there are more than one most frequent pitch values, i.e. more than one pitch value occur with equally high frequency. In one or more embodiments, the most frequent pitch value of this speaker is determined as the pitch value occurring with the highest frequency and being closest to the mean value of all pitch values in such condition.

FIG. 3B shows an example method during a testing phase during which speakers with unknown gender are identified as male or female speakers.

In element (311) of the testing phase, the most frequent pitch values ($P_1, P_2, \ldots P_n$) of all speakers with unknown gender are determined first. Then, for every speaker (e.g. speaker k) with unknown gender, the most frequent pitch value $P_k$ is compared in element (312) with the thresholds $P_M$ and $P_F$ determined in the training phase described in reference to FIG. 3A above.

If it is determined that $P_k$<$P_M$ in element (313), the speaker k with unknown gender is identified as a male and included into the male speaker cluster (316). If it is determined that $P_k$>$P_F$ in element (315), the speaker k with unknown gender is identified as a female and included into the female speaker cluster (318). If it is determined that $P_M$<$P_k$<$P_F$ in element (317), then speaker k with unknown gender is identified as a suspicious speaker and included into the suspicious speaker cluster (317).

In element (319), for each suspicious speaker in the cluster (317), the feature vectors of his or her pitch values (with the same dimension as used in the training phase described in reference to FIG. 3A above) are generated and then inputted into male GMM (320) and female GMM model (321), which are trained and initialized during the training phase described in reference to FIG. 3A above. Suppose the feature vector is denoted by $v_{i,j}$ where i denotes the feature vector index (i.e., i=1, 2, . . . number of dimensions of the feature vector) and j denotes the speaker index (i.e., j=1, 2, . . . number of speakers). Also the male GMM (320) and female GMM (321) are denoted by $f_M$ and $f_F$, respectively. Thus, the output of male GMM (320) and female GMM (321) are obtained by $\Sigma_i \log(f_F(v_{i,j}))$ and $\Sigma_i \log(f_F(v_{i,j}))$, respectively. Mathematical equations for GMM are well known to those skilled in the art. For example, GMM may be represented as a weighted sum of component densities calculated from feature vector elements $v_{i,j}$ based on a mean vector and covariance matrix associated with the feature vector where the weights of all component densities are normalized (i.e., summed to 1). Please confirm accuracy of above statements.

For each suspicious speaker in the cluster (317), if the male GMM yields a larger output than the female GMM in element (322), then the suspicious speaker is classified in element (323) as male speaker. Otherwise, the suspicious speaker is classified as female speaker.

Although the example shown in FIGS. 3A and 3B above describes a two stage classification with a first stage with minimum processing and a second stage with detailed processing, it is contemplated that the two stage gender identification can be extended to multi-stage gender identification with successively more detailed processing or alternating minimum/detail processing such that no speaker is identified as suspicious speaker at the completion of the multiple processing stages.

Experimental results are obtained based on the example method described in reference to FIGS. 3A and 3B above. Experiments are carried out using utterances from 111 men and 111 women. 77 sequences of these digits were collected from each speaker. The data were collected in a quiet environment with the microphone placed 2-4 inches in front of the speaker's mouth and digitized at 20 kHz. For the 77 sequences from each speaker, 39 sequences are used for training and the rest 38 sequences are used for testing. For every sequence, only the speech frame which has the largest energy is extracted and the pitch period is estimated from that frame. Thus, for each speaker, 39 pitch values are estimated for training and 38 pitch values are estimated for testing.

For the pitch feature extraction process, the experiment shows that for 111 male speakers and 111 female speakers, a total of 1217.5 s is spent. That is to say, for every speaker, about 5.5 s is used for the pitch feature extraction. This is sufficient for the real-time application.

For the gender identification process, training and testing are separately carried out. In the training phase, among the most frequent pitch values of all male speakers, the maximum value is 185.55 Hz. Among the most frequent pitch values of all female speakers, the minimum value is 156.3 Hz. Thus, the minimum female pitch value threshold and the maximum male pitch value threshold can be set as 156.3 Hz and 185.55 Hz, respectively. All the speakers whose most frequent pitch values fall between 156.3 Hz and 185.55 Hz are identified as suspicious speakers. For suspicious speakers, the second stage GMM classifier is applied. GMMs of male speakers and female speakers are trained by 2-dimension pitch feature vectors of all male speakers and all female speakers, respectively. In the training phase, there are 39 pitch values for each speaker. Thus, for GMMs of both male speakers and female speakers, 19*111=2109 pitch feature vectors are available for training. The orders of both GMMs are set as 5 and both GMMs are initialized by k-means clustering. In the testing phase, if the most frequent pitch value of a speaker is larger than 185.55 Hz, then this speaker is identified as a female speaker. If the most frequent pitch value of a speaker is smaller than 156.3 Hz, then this speaker is identified as a male speaker. Otherwise, this speaker is identified as a suspicious speaker that needs to be classified in the second stage by using GMMs. In the first stage gender identification using the thresholding method, 10 out of 111 male speakers are identified as suspicious speakers and 14 out of 111 female speakers are identified as suspicious speakers. For each suspicious speaker, the 2-dimension pitch feature vector of his or her pitch values for testing are fed into both GMMs. In the testing phase, there are 38 pitch values for each speaker. Thus, for each speaker, 19*111=2109 pitch feature vectors are available for testing. The GMM model that yields the larger output will be selected. In this way, the gender decision of every suspicious speaker is made. Tables 1 and 2 compare the two stage classifier, the threshold-only classifier, and the GMM-only classifier with respect to the gender identification performance of correct identification rate, computation complexity measured in time cost of gender identification for each speaker, and memory requirements.

TABLE 1

| Classifier | Correct Identification Rate | Computation Time |
|---|---|---|
| Pitch Thresholding + GMM | 98.65% | 5.6078 s |
| Pitch Thresholding | 96.85% | 5.4848 s |
| GMM | 98.2% | 5.6217 s |

TABLE 2

| Classifier | Memory Required Data |
|---|---|
| Pitch Thresholding + GMM | Pitch Values of all Suspicious Speakers, GMM Parameters |
| Pitch Thresholding | Most Frequent Pitch Values of all Speakers |
| GMM | Pitch Values of all Speakers, GMM Parameters. |

Figure 4:
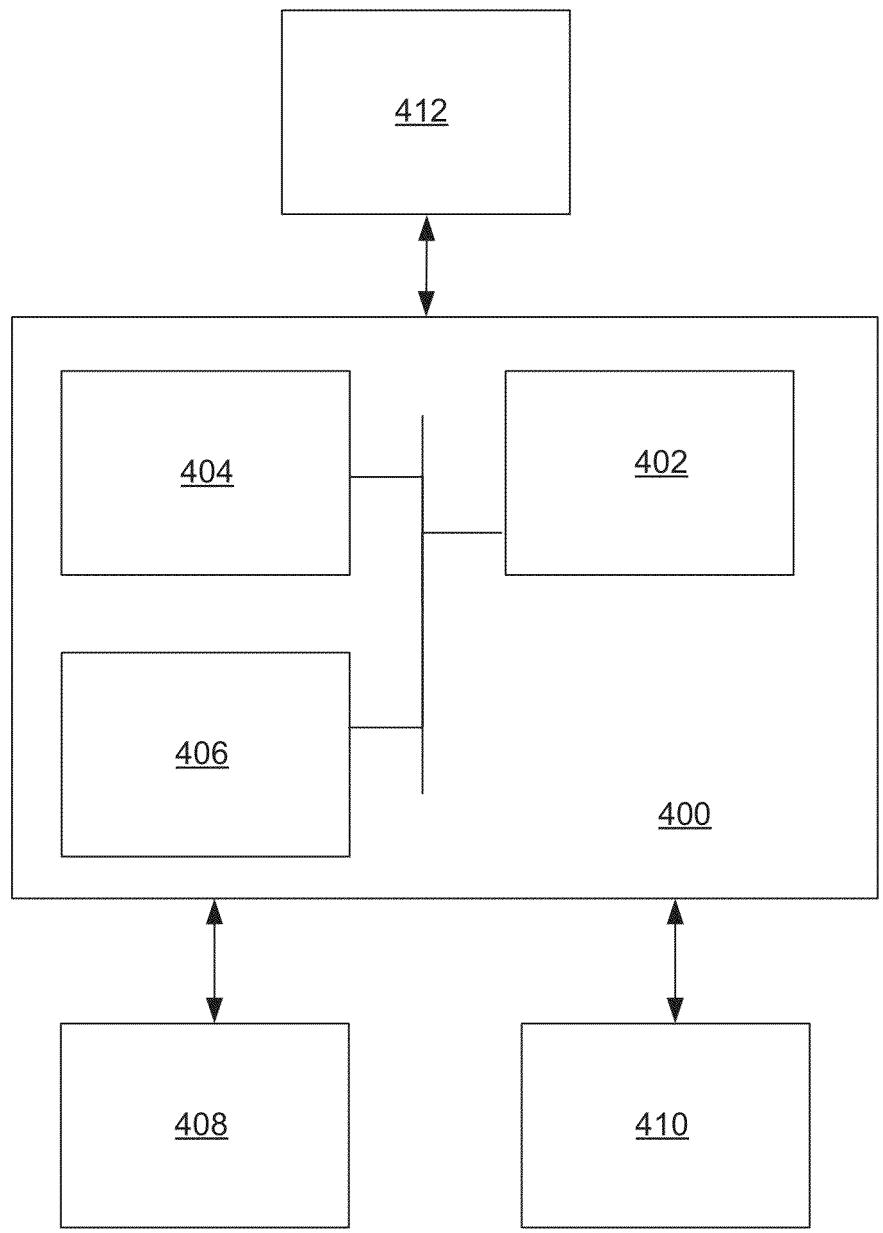
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a gender of a speaker, comprising:
obtaining speech data of the speaker;
extracting, using a processor of a computer, a plurality of vowel-like speech frames from the speech data;
analyzing, using the processor, the plurality of vowel-like speech frames to generate a feature vector comprising a plurality of pitch values of the speaker, wherein each of the plurality of pitch values corresponds to one of the plurality of vowel-like frames;
analyzing, using the processor, the plurality of pitch values to generate a most frequent pitch value;
determining a first pre-determined threshold and a second pre-determined threshold based on an overlapping portion of a male pitch value training set and a female pitch value training set;
configuring a male Gaussian Mixture Model (GMM) and a female GMM by using the male pitch value training set and the female pitch value training set, respectively, to train a suspicious speaker model for modeling male and female speaker pitch value distributions;
determining, using the processor and in response to the most frequent pitch value being between the first pre-determined threshold and the second pre-determined threshold, an output of the male GMM and an output of the female GMM using the pitch value distributions of the suspicious speaker model as inputs to the male GMM and the female GMM; and
identifying the gender of the speaker by comparing the output of the male GMM and the output of the female GMM based on a pre-determined criterion.

2. The method of claim 1,
wherein the gender is identified as male if the output of the male GMM exceeds the output of the female GMM, and
wherein the gender is identified as female if the output of the male GMM is less than the output of the female GMM.

3. The method of claim 1, further comprising:
identifying the gender as male in response to the most frequent pitch value being less than the first pre-determined threshold; and
identifying the gender as female in response to the most frequent pitch value exceeding the second pre-determined threshold.

4. The method of claim 1, wherein analyzing the plurality of vowel-like speech frames to generate the feature vector comprises:
representing a vowel-like speech frame of the plurality of vowel-like speech frames as a sum of a plurality of amplitude modulation and frequency modulation (AM-FM) models corresponding to a plurality of formants;

determining, using the processor, one or more dominant formant frequencies based on the vowel-like speech frame and the plurality of AM-FM models;

generating one or more set of filtered speech frames by band-passed filtering the vowel-like speech frame based on the one or more dominant formant frequencies;

generating one or more quasi-periodic amplitude envelopes from the one or more set of filtered speech frames using discrete energy separation algorithm (DESA); and determining a pitch value of the plurality of pitch values corresponding to the vowel-like speech frame from the one or more quasi-periodic amplitude envelopes.

5. The method of claim 1, wherein the feature vector is generated with a resolution of 10 Hz for the plurality of pitch values.

6. The method of claim 1, further comprising:
obtaining male training speech data of a plurality of male speakers and female training speech data of a plurality of female speakers during a training phase;
determining a plurality of male pitch values based on the male training speech data and a plurality of female pitch values based on the female training speech data;
determining the first pre-determined threshold based on the plurality of female pitch values; and
determining the second pre-determined threshold based on the plurality of male pitch values.

7. The method of claim 6, wherein determining the first pre-determined threshold based on the plurality of female pitch values comprises:
determining a plurality of most frequent female pitch values based on the plurality of female pitch values, wherein each of the plurality of most frequent female pitch values corresponds to one of the plurality of female speakers; and
determining the first pre-determined threshold based on a minimum of the plurality of most frequent female pitch values.

8. The method of claim 6, wherein determining the second pre-determined threshold based on the plurality of male pitch values comprises:
determining a plurality of most frequent male pitch values based on the plurality of male pitch values, wherein each of the plurality of most frequent male pitch values corresponds to one of the plurality of male speakers; and
determining the second pre-determined threshold based on a maximum of the plurality of most frequent male pitch values.

9. The method of claim 6, further comprising:
training the male GMM using the plurality of male pitch values based on expectation maximization algorithm;
training the female GMM using the plurality of female pitch values based on expectation maximization algorithm; and
initializing the male GMM and the female GMM by k-mean clustering.

10. The method of claim 6, wherein the plurality of most frequent male pitch values and the plurality of most frequent female pitch values are determined with a resolution of 10 Hz.

11. A system for identifying a gender of a speaker, comprising:
a processor; and
memory storing instructions when executed by the processor comprising functionalities for:
extracting a plurality of vowel-like speech frames from the speech data;
analyzing the plurality of vowel-like speech frames to generate a feature vector comprising a plurality of pitch values of the speaker, wherein each of the plurality of pitch values corresponds to one of the plurality of vowel-like frames;
analyzing the plurality of pitch values to generate a most frequent pitch value;
determining a first pre-determined threshold and a second pre-determined threshold based on an overlapping portion of a male pitch value training set and a female pitch value training set;
configuring a male Gaussian Mixture Model (GMM) and a female GMM by using the male pitch value training set and the female pitch value training set, respectively, to train a suspicious speaker model for modeling male and female speaker pitch value distributions;
determining, in response to the most frequent pitch value being between the first pre-determined threshold and the second pre-determined threshold, an output of the male GMM and an output of the female GMM using the pitch value distributions of the suspicious speaker model as inputs to the male GMM and the female GMM; and
identifying the gender of the speaker by comparing the output of the male GMM and the output of the female GMM based on a pre-determined criterion.

12. The system of claim 11,
wherein the gender is identified as male if the output of the male GMM exceeds the output of the female GMM, and
wherein the gender is identified as female if the output of the male GMM is less than the output of the female GMM.

13. The system of claim 11, the instructions when executed by the processor further comprising functionalities for:
identifying the gender as male in response to the most frequent pitch value being less than the first pre-determined threshold; and
identifying the gender as female in response to the most frequent pitch value exceeding the second pre-determined threshold.

14. The system of claim 11, wherein analyzing the plurality of vowel-like speech frames to generate the feature vector comprises:
representing a vowel-like speech frame of the plurality of vowel-like speech frames as a sum of a plurality of amplitude modulation and frequency modulation (AM-FM) models corresponding to a plurality of formants;
determining, using the processor, one or more dominant formant frequencies based on the vowel-like speech frame and the plurality of AM-FM models;
generating one or more set of filtered speech frames by band-passed filtering the vowel-like speech frame based on the one or more dominant formant frequencies;
generating one or more quasi-periodic amplitude envelopes from the one or more set of filtered speech frames using discrete energy separation algorithm (DESA); and
determining a pitch of the plurality of pitch values corresponding to the vowel-like speech frame from the one or more quasi-periodic amplitude envelopes.

15. The system of claim 11, the instructions when executed by the processor further comprising functionalities for:
obtaining male training speech data of a plurality of male speakers and female training speech data of a plurality of female speakers during a training phase;
determining a plurality of male pitch values based on the male training speech data and a plurality of female pitch values based on the female training speech data;

determining the first pre-determined threshold based on the plurality of female pitch values; and determining the second pre-determined threshold based on the plurality of male pitch values.

16. The system of claim 15, wherein determining the first pre-determined threshold based on the plurality of female pitch values comprises:

determining a plurality of most frequent female pitch values based on the plurality of female pitch values, wherein each of the plurality of most frequent female pitch values corresponds to one of the plurality of female speakers; and determining the first pre-determined threshold based on a minimum of the plurality of most frequent female pitch values.

17. The system of claim 15, wherein determining the second pre-determined threshold based on the plurality of male pitch values comprises:

determining a plurality of most frequent male pitch values based on the plurality of male pitch values, wherein each of the plurality of most frequent male pitch values corresponds to one of the plurality of male speakers; and determining the second pre-determined threshold based on a maximum of the plurality of most frequent male pitch values.

18. The system of claim 15, the instructions when executed by the processor further comprising functionalities for:

training the male GMM using the plurality of male pitch values based on expectation maximization algorithm;

training the female GMM using the plurality of female pitch values based on expectation maximization algorithm; and initializing the male GMM and the female GMM by k-mean clustering.

19. A non-transitory computer readable storage medium, embodying instructions to perform real-time speaker recognition, the instructions when executed by a computer comprising functionality for:

obtaining speech data of the speaker;

extracting a plurality of vowel-like speech frames from the speech data;

analyzing the plurality of vowel-like speech frames to generate a feature vector comprising a plurality of pitch values of the speaker, wherein each of the plurality of pitch values corresponds to one of the plurality of vowel-like frames;

analyzing the plurality of pitch values to generate a most frequent pitch value;

determining a first pre-determined threshold and a second pre-determined threshold based on an overlapping portion of a male pitch value training set and a female pitch value training set;

configuring a male Gaussian Mixture Model (GMM) and a female GMM by using the male pitch value training set and the female pitch value training set, respectively, to train a suspicious speaker model for modeling male and female speaker pitch value distributions;

determining, in response to the most frequent pitch value being between the first pre-determined threshold and the second pre-determined threshold, an output of the male GMM and an output of the female GMM using the pitch value distributions of the suspicious speaker model as inputs to the male GMM and the female GMM; and identifying the gender of the speaker by comparing the output of the male GMM and the output of the female GMM based on a pre-determined criterion.

20. The non-transitory computer readable storage medium of claim 19, wherein the gender is identified as male if the output of the male GMM exceeds the output of the female GMM, and wherein the gender is identified as female if the output of the male GMM is less than the output of the female GMM.

21. The non-transitory computer readable storage medium of claim 19, the instructions when executed by the computer further comprising functionality for:

identifying the gender as male in response to the most frequent pitch value being less than the first pre-determined threshold; and identifying the gender as female in response to the most frequent pitch value exceeding the second pre-determined threshold.

22. The non-transitory computer readable storage medium of claim 19, wherein analyzing the plurality of vowel-like speech frames to generate the feature vector comprises:

representing a vowel-like speech frame of the plurality of vowel-like speech frames as a sum of a plurality of amplitude modulation and frequency modulation (AM-FM) models corresponding to a plurality of formants;

determining one or more dominant formant frequencies based on the vowel-like speech frame and the plurality of AM-FM models;

generating one or more set of filtered speech frames by band-passed filtering the vowel-like speech frame based on the one or more dominant formant frequencies;

generating one or more quasi-periodic amplitude envelopes from the one or more set of filtered speech frames using discrete energy separation algorithm (DESA); and determining a pitch value of the plurality of pitch values corresponding to the vowel-like speech frame from the one or more quasi-periodic amplitude envelopes.

23. The non-transitory computer readable storage medium of claim 19, wherein the feature vector is generated with a resolution of 10 Hz for the plurality of pitch values.

24. The non-transitory computer readable storage medium of claim 19, the instructions when executed by the computer further comprising functionality for:

obtaining male training speech data of a plurality of male speakers and female training speech data of a plurality of female speakers during a training phase;

determining a plurality of male pitch values based on the male training speech data and a plurality of female pitch values based on the female training speech data;

determining the first pre-determined threshold based on the plurality of female pitch values; and determining the second pre-determined threshold based on the plurality of male pitch values.

25. The non-transitory computer readable storage medium of claim 24, wherein determining the first pre-determined threshold based on the plurality of female pitch values comprises:

determining a plurality of most frequent female pitch values based on the plurality of female pitch values, wherein each of the plurality of most frequent female pitch values corresponds to one of the plurality of female speakers; and determining the first pre-determined threshold based on a minimum of the plurality of most frequent female pitch values.

26. The non-transitory computer readable storage medium of claim 24, wherein determining the second pre-determined threshold based on the plurality of male pitch values comprises:

determining a plurality of most frequent male pitch values based on the plurality of male pitch values, wherein each of the plurality of most frequent male pitch values corresponds to one of the plurality of male speakers; and determining the second pre-determined threshold based on a maximum of the plurality of most frequent male pitch values.

27. The non-transitory computer readable storage medium of claim 24, the instructions when executed by the computer further comprising functionality for:

training the male GMM using the plurality of male pitch values based on expectation maximization algorithm;

training the female GMM using the plurality of female pitch values based on expectation maximization algorithm; and initializing the male GMM and the female GMM by k-mean clustering.

28. The non-transitory computer readable storage medium of claim 24, wherein the plurality of most frequent male pitch values and the plurality of most frequent female pitch values are determined with a resolution of 10 Hz.

* * * * *